(12) United States Patent
Jeon

(10) Patent No.: US 6,621,311 B2
(45) Date of Patent: Sep. 16, 2003

(54) POWER NOISE PREVENTION CIRCUIT IN MICROCONTROLLER UNIT

(75) Inventor: Hyun Kyu Jeon, Choongcheongbuk-Do (KR)

(73) Assignee: Hynix Semiconductor, Inc., Kyoungki-Do (KR)

(*) Notice: Subject to any disclaimer, the term of this patent is extended or adjusted under 35 U.S.C. 154(b) by 0 days.

(21) Appl. No.: 10/028,588

(22) Filed: Dec. 28, 2001

(65) Prior Publication Data

US 2002/0084813 A1 Jul. 4, 2002

(30) Foreign Application Priority Data

Dec. 30, 2000 (KR) .......................................... 2000-87285

(51) Int. Cl.[7] .................................................. H03L 7/00
(52) U.S. Cl. ........................ 327/142; 327/143; 327/198
(58) Field of Search ................................ 327/142, 143, 327/144, 198, 150; 307/66, 64, 65; 379/413

(56) References Cited

U.S. PATENT DOCUMENTS 5,606,511 A * 2/1997 Yach ............................ 364/483
5,834,857 A * 11/1998 Abe et al. ..................... 307/66
6,084,961 A * 7/2000 Hwang et al. ............... 379/413
6,097,226 A   8/2000 Kim ............................. 327/143

* cited by examiner

Primary Examiner—Tuan T. Lam
Assistant Examiner—Hiep Nguyen
(74) Attorney, Agent, or Firm—Birch, Stewart, Kolasch & Birch, LLP

(57) ABSTRACT

A power noise prevention circuit in an MCU, includes a system clock generating circuit generating a system clock signal by receiving a clock signal, a clock freezing and synchronizing part outputting the system clock signal during a power failure, a reset circuit resetting an MCU during the power failure, a power fail detection circuit detecting a power level based on a freeze level and a reset level, and a power fail detection register controlling a detection operation and a detection mode of the power fail detection circuit. The power fail detection circuit operates the clock freezing and synchronizing part when a power level reaches the freeze level, and operates the reset circuit when the power level reaches the reset level.

24 Claims, 4 Drawing Sheets

POWER NOISE PREVENTION CIRCUIT IN MICROCONTROLLER UNIT

RELATED APPLICATION

The present application claims the benefit of Korean Patent Application No. 87285/2000 filed Dec. 30, 2000, under 35 U.S.C. §119, which is herein fully incorporated by reference.

BACKGROUND OF THE INVENTION

1. Field of the Invention

The present invention relates to a micro-controller unit, and more particularly, to a power noise prevention circuit in a micro-controller unit (MCU).

2. Discussion of the Related Art

FIG. 1 shows a power noise prevention circuit in an MCU according to a first embodiment as disclosed in U.S. Pat. No. 6,097,226, which is owned by the same assignee of the present invention.

Referring to FIG. 1, in the power noise prevention circuit, a power fail detection circuit 10 and a reset circuit 11 are provided. When a power is reduced to a level insufficient for operating the MCU normally due to a power noise inputted to the MCU, the power fail detection circuit 10 detects the power failure and generates a power fail signal. The reset circuit 11 receives the power fail signal and prevents the MCU from being operated falsely in accordance with the power noise by resetting the MCU.

FIG. 2 shows a power noise prevention circuit in an MCU according to a second embodiment as discussed in the above-discussed U.S. Pat. No. 6,097,226.

Referring to FIG. 2, in this power noise prevention circuit, a power fail detection circuit 22, a system clock generating circuit 20, and a clock freezing and synchronizing circuit 21 are provided. When the power is at a normal level, the system clock generating circuit 20 produces a system clock signal SCLK1 by receiving a basic clock signal ICLK from an oscillator. The clock freezing and synchronizing circuit 21 is synchronized by the system clock signal SCLK1 and outputs another system clock signal SCLK2, which is identical to the system clock signal SCLK1, to an internal circuit.

The power fail detection circuit 22 enables a power fail signal POWER FAIL if a power noise is inputted to the MCU. The clock freezing and synchronizing circuit 21 outputs the system clock signal SCLK2, which is transferred to the internal circuit, as a fixed state of the system clock signal SCLK1 at the moment of the power-failure in accordance with the enabled power fail signal. As a result, the internal state of the MCU is temporarily frozen during the power-failure.

If the power fail signal is disabled as the power is restored normally, the clock freezing and synchronizing circuit 21 is synchronized again by the system clock signal SCLK1 and outputs a system clock signal SCLK2 identical to the system clock signal SCLK1 to the internal circuit. Therefore, the MCU is able to carry out the next operation normally.

As mentioned in the above explanation, the power noise prevention circuit according to the first embodiment of the related art always resets the MCU if a power noise is inputted thereto. Unfortunately, if the MCU is always reset responsive to the power noise input, the entire system itself equipped with the MCU becomes initialized. For instance, a TV set which is turned on becomes turned off, a wash machine stops (even during a washing operation) and returns to the initial state, or a medical appliance which is being used will stop operating suddenly. Such events are inconvenient to users and can have serious consequences.

Moreover, the power noise prevention circuit according to the second embodiment of the related art freezes the internal state of the MCU temporarily by holding the system clock signal temporarily when a power noise is inputted thereto. Then, after the power has been restored, the power noise prevention circuit is able to carry out a successive operation by releasing the frozen internal state of the MCU.

But, if the power is reduced to a level at which a CMOS of the MCU is unable to operate normally, the frozen MCU may enter a state unwanted or unpredicted by the user. To avoid this problem, a general MCU may include a reset circuit to reset the MCU when the power is reduced to the level at which the CMOS is unable to operate normally. However, these levels differ depending on different products and applications, which is generally not recognized and understood by users.

SUMMARY OF THE INVENTION

Accordingly, the present invention is directed to a power noise protection circuit in a micro-controller unit that substantially obviates one or more problems due to limitations and disadvantages of the related art.

An object of the present invention is to provide a power noise protection circuit in a micro-controller unit that effectively prevents the abnormal operation of the MCU due to a power noise.

Another object of the present invention is to provide a power noise protection circuit in a micro-controller unit that allows a user to adjust properly a power fail detection method in accordance with the application.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power noise protection circuit in a micro-controller unit according to an embodiment of the present invention includes a system clock producing circuit producing a system clock signal by receiving a clock signal, a clock-freeze and synchronization part outputting fixedly the system clock signal outputted from the system clock producing circuit during power failure, a reset circuit resetting an MCU during the power failure, a power fail detection circuit dividing a detection level of a power into a freeze level and a reset level, the power fail detection circuit operating the clock-freeze and synchronization part when a power level reaches the freeze level, and the power fail detection circuit operating the reset circuit when the power level reaches the reset level, and a power fail detection register controlling a detection operation and a detection mode of the power fail detection circuit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
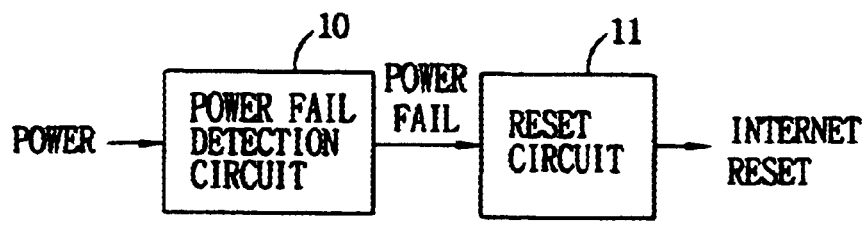
FIG. 1 illustrates a power noise prevention circuit in an MCU according to a first embodiment of a related art.
Figure 2:
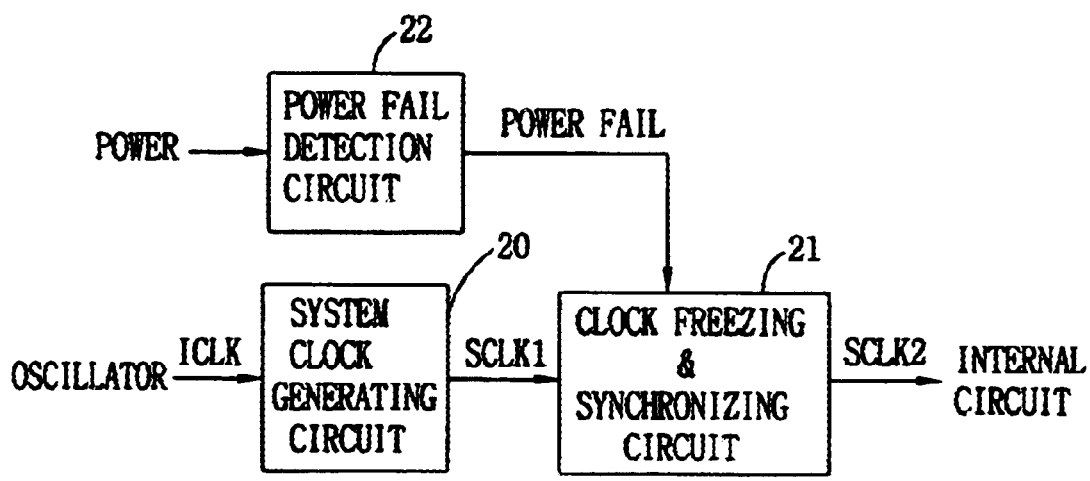
FIG. 2 illustrates a power noise prevention circuit in an MCU according to a second embodiment of the related art.
Figures 3, 4:
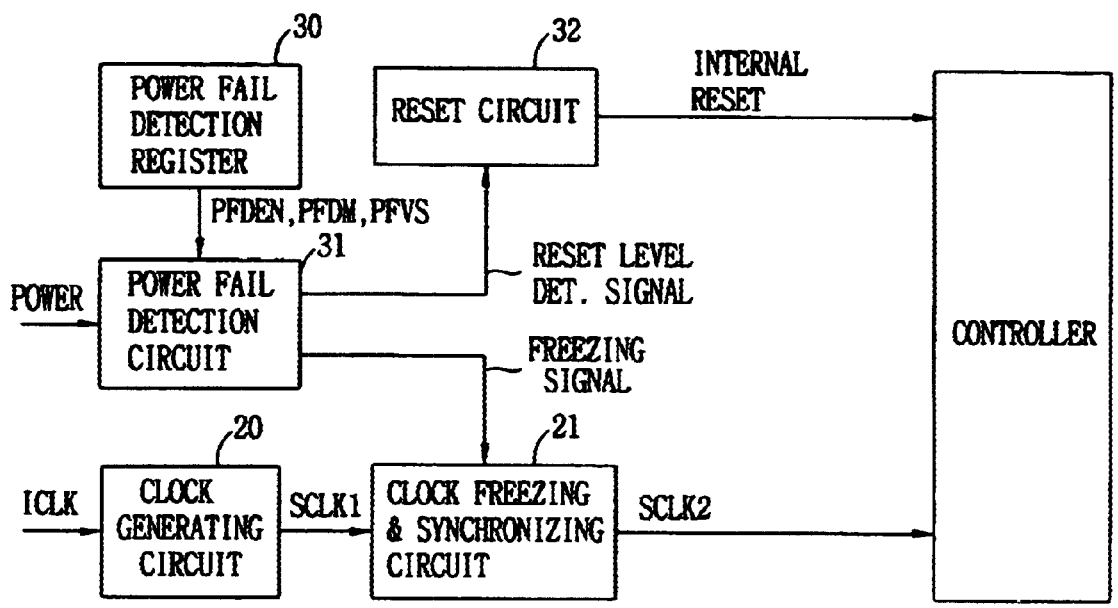
FIG. 3 illustrates a block diagram of a power noise prevention circuit in an MCU according to an embodiment of the present invention.
FIG. 4 illustrates a detailed construction of a power fail detection register in FIG. 3.

FIG. 3 illustrates a block diagram of a power noise prevention circuit in an MCU according to an embodiment of the present invention.

Referring to FIG. 3, a power noise prevention circuit in an MCU according to an embodiment of the present invention is constructed with a system clock generating circuit 20, a clock freezing and synchronizing circuit 21, a power fail detection register 30, a power fail detection (PFD) circuit 31, and a reset circuit 32, all operatively coupled.

The system clock generating circuit 20 and the clock freezing and synchronizing circuit 21 are identical to those of the related art, except that the clock freezing and synchronizing circuit 21 receives a freezing signal. The power fail detection register 30 manages the power fail detection operation of the power fail detection circuit 31.

The power fail detection circuit 31 detects a power level when a power noise is inputted by dividing the power level into a freeze level and a reset level FIG. 4 shows an internal bit construction of the power fail detection register 30 of FIG. 3 according to an embodiment of the present invention.

Referring to FIG. 4, a state signal PFVS representing a normal or power fail state is stored at a first bit Bit0 of the power fail detection register 30. A mode signal PFDM for establishing an operation mode (freeze mode/reset mode) is stored at a second bit Bit1. An enabling signal PFDEN for operating the power fail detection circuit 31 is stored at a third bit Bit2. No other information may be provided in the rest bits Bit4 to Bit7.

Figure 5:
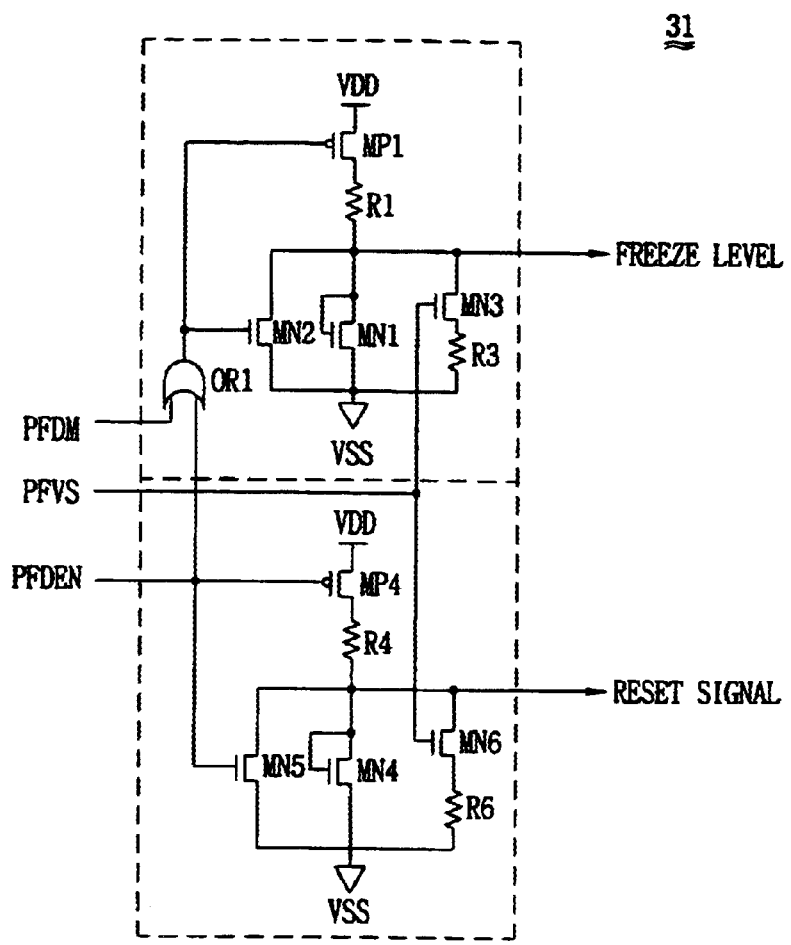
FIG. 5 illustrates a detailed construction of a power fail detection circuit in FIG. 3.

FIG. 5 illustrates a detailed construction of the power fail detection circuit 31 in FIG. 3 in accordance with an embodiment of the present invention.

Referring to FIG. 5, the power fail detection circuit 31 is constructed with a freeze level detection part 100 and a reset level detection part 200 detecting a freeze level and a reset level, respectively, in accordance with the PFDM, PFVS and PFDEN signals outputted from the power fail detection register 30. The freeze level and detection parts 100 and 200 are operatively coupled. The freeze level detection part 100 includes NMOS transistors MN1, MN2 and MN3, a PMOS transistor MP1, resistors R1 and R3, and an OR-gate OR1, all operatively coupled. The reset level detection part 200 includes NMOS transistors MN4, MN5 and MN6, a PMOS transistor MP4, and resistors R4 and R6, all operatively coupled.

Figure 6:
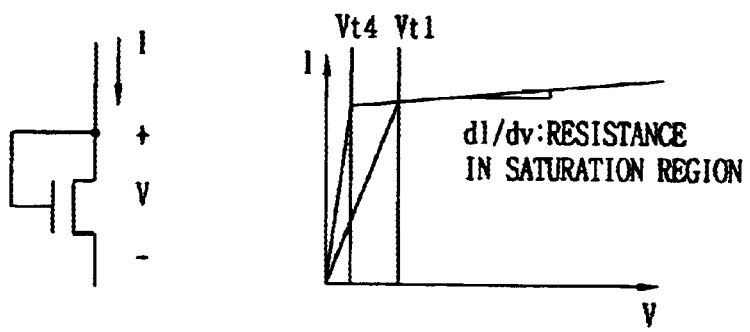
FIG. 6 shows a resistance characteristic of NMOS transistors MN1 and MN4 in FIG. 5.

The construction of the freeze level detection part 100 is similar to that of the reset level detection part 200. The freeze and reset levels depend on a ratio between the resistance of a resistor R1 and a resistance Rmn1 and a ratio between the resistance of a resistor R4 and a resistance Rmn4, respectively. Here, 'Rmn1' and 'Rmn4' are the resistances of NMOS transistors MN1 and MN4, respectively. Moreover, the resistances Rmn1 and Rmn4 of the NMOS transistors MN1 and MN4, as shown in FIG. 6, are hardly influenced by the variation of operational voltages. A threshold voltage Vt1 of the NMOS transistor MN1 is higher than the threshold voltage Vt4 of the NMOS transistor MN4.

The reset circuit 32 produces a reset signal in accordance with a reset level detection signal outputted from the power fail detection circuit 31. The reset signal is used to reset the MCU.

The operation of the power noise prevention circuit in the MCU according to the present invention is described as follows by referring to the attached drawings.

The power fail detection circuit 31 detects a power level to detect a power noise input in a manner so that the detected power level is classified as a freeze level or a reset level.

Figure 7:
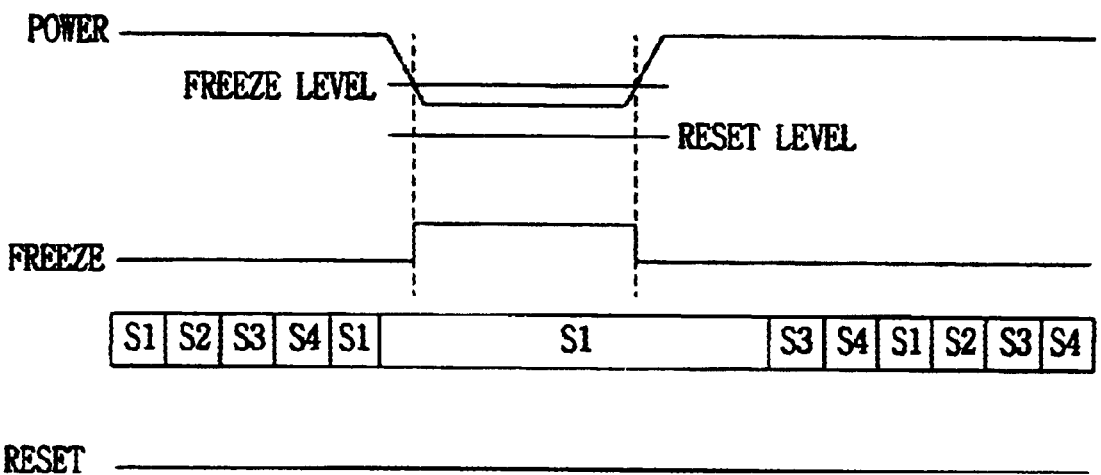
FIG. 7 shows an operational timing graph for the power fail detection circuit and the clock freezing and synchronizing circuit in FIG. 3 when a power is reduced under a freeze level.

When the power level is reduced to a predetermined freeze level, the power fail detection circuit 31 activates the clock freezing and synchronizing circuit 21, as shown in FIG. 7, by generating and outputting a high freezing signal to the circuit 21. Responsive to the high freezing signal, the clock freezing and synchronizing circuit 21 generates an appropriate clock signal SCLK2 which freezes the internal state of the MCU temporarily. After the power is restored, the power fail detection circuit 31 releases the internal state of the MCU from the frozen state, so as to carry out a subsequent operation normally.

Figure 8:
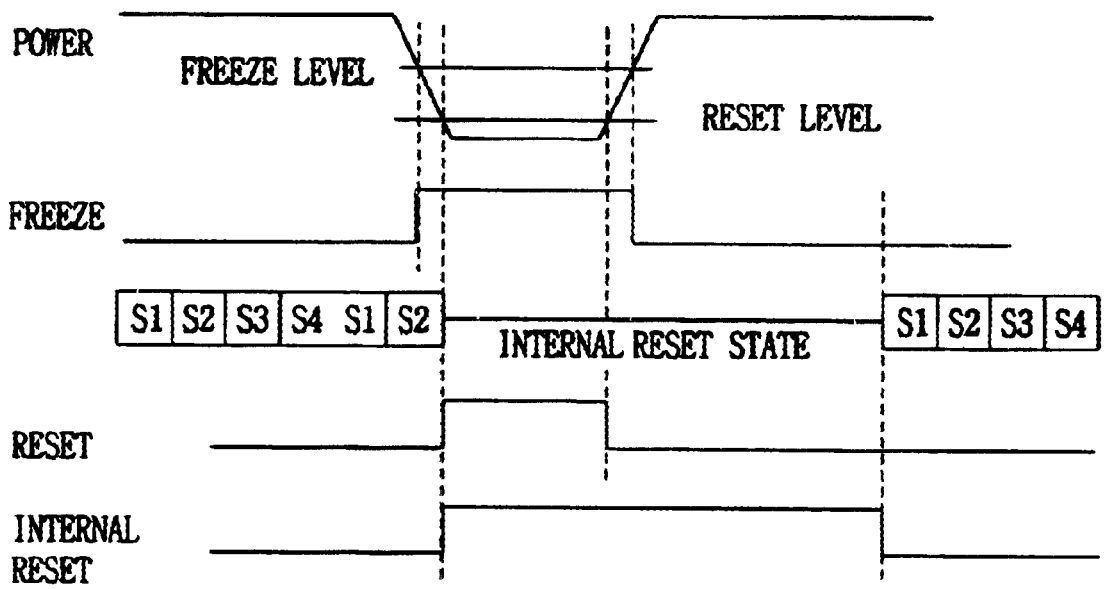
FIG. 8 shows an operational timing graph for the power fail detection circuit, the clock freezing and synchronizing circuit, and the reset circuit in FIG. 3 when a power is reduced under a reset level.

When the power level is further reduced to a predetermined reset level which is lower than the predetermined freeze level, the power fail detection circuit 31 activates the reset circuit 32, as shown in FIG. 8, by generating and outputting a high reset level detection signal. Responsive to the high reset level detection signal, the reset circuit 32 generates and outputs an internal reset signal to the MCU. Thus, the MCU becomes reset, thereby preventing malfunction of the MCU due to an abnormal operation of CMOS in the MCU.

In a preferred embodiment, the power fail detection and the detection mode of the power fail detection circuit 31 are managed by the power fail detection register 30 which is controlled by a user. Namely, a user determines the operation and detection mode of the power fail detection circuit 31 by establishing a mode signal PFDM, a state signal PFVS, and an enabling signal PFDEN of the power fail detection register 30, as shown in FIG. 4, using computer software and/or other means. In another embodiment, such signals can be selected automatically according to predetermined conditions. In one example, such signals can be selected randomly by software.

In the preferred embodiment, if the user establishes the value of the PFDEN (Bit2) as "1", as shown in FIG. 5, the power fail detection circuit 31 enters an enabled state. In this enabled state, if the user establishes the value of the PFDM (Bit1) as "0", the freeze level detection part 100 and the reset level detection part 200 initiate the power fail detection operation as a PMOS transistor MP1 is turned on.

When a power level begins to be reduced by a power noise, as shown in FIG. 5, the freeze and reset signals of low level are outputted through output terminals of the freeze level detection part 100 and reset level detection part 200, respectively. At this point, the NMOS transistors MN1 and MN4 are turned on.

When the power level is further reduced to the predetermined freeze level, the NMOS transistor MN1 becomes turned off while the other NMOS transistor MN4 is still turned on. Therefore, as shown in FIG. 7, at this time, a freezing signal of high level is outputted from the freeze level detection part 100 and a reset level detection signal of low level is outputted from the reset level detection part 200. In this case, the threshold voltage Vt1 of the NMOS transistor MN1 is set to be higher than that the threshold voltage Vt4 of the NMOS transistor MN4.

Responsive to the high freezing signal, the clock freezing and synchronizing circuit 21 outputs a system clock signal SCLK2 which represents a fixed state of a system clock signal SCLK1 at the moment of the power failure, whereby the internal state of the MCU is temporarily frozen during the power-failure.

If the power level is further reduced to the predetermined reset level, the NMOS transistors MN1 and MN4 both become turned off. As a result, as shown in FIG. 8, the freezing signal and reset level detection signal of high level are outputted from the freeze level detection part 100 and the reset level detection part 200, respectively.

Responsive to the high reset level detection signal, the reset circuit 32 produces an internal reset signal, as shown in FIG. 8, and then outputs the internal reset signal to the MCU to reset the MCU. Namely, if the power is reduced to the predetermined reset level, the MCU is reset to prevent errors in a CMOS operation despite the present frozen state of the MCU.

Besides, if the mode signal PFDM is set as "1" by the user, the operation of the freeze level detection part 100 stops by turning off the PMOS transistor MP1 of the freeze level detection part 100, so that only the reset level detection part 200 operates. The reset circuit 32 outputs the internal reset signal to the MCU on a power failure in accordance with the reset level detection signal of high level outputted from the reset level detection part 200, whereby the MCU always becomes reset on the power failure.

Moreover, the user is able to adjust the predetermined freeze and reset levels by setting the enabling signal PFDEN as "1". Namely, if the enabling signal PFDEN is set to "1", the NMOS transistors MN3 and MN6 in FIG. 5 are turned on. Thus, the voltages applied to the parallel resistances Rmn1//R3 and Rmn4//R6 respectively become reduced so that the freeze and reset levels are lowered as well.

Accordingly, a power noise prevention circuit in an MCU according to the present invention where a power level is detected to a freeze level and a reset level, freezes the internal state of the MCU temporarily when the power level is reduced to the freeze level and/or resets the MCU when the power level is reduced to the reset level, thereby preventing the abnormal operation of the MCU effectively.

Moreover, the present invention enables the user to adjust a power fail detection operation using a proper detection method in accordance with application so as to prevent the abnormal operation of the MCU due to a power noise.

The forgoing embodiments are merely exemplary and are not to be construed as limiting the present invention. The present teachings can be readily applied to other types of apparatuses, systems, etc. The description of the present invention is intended to be illustrative, and not to limit the scope of the claims. Many alternatives, modifications, and variations will be apparent to those skilled in the art.

What is claimed is:

1. A power noise prevention device for a controller, comprising:

a power fail detection part detecting a power level based on a freeze level and a reset level, the power fail detection part operating a clock freezing and synchronizing part when the power level reaches the freeze level, the power fail detection part operating a reset part when the power level reaches the reset level;

the clock freezing and synchronizing part generating a system clock signal when the power level reaches the freeze level to freeze an operation of the controller;

the reset part resetting the controller when the power level reaches the reset level; and a power fail detection register controlling an operation of the power fail detection part.

2. The power noise prevention device of claim 1, wherein the freeze level is higher than the reset level.

3. The power noise prevention device of claim 1, wherein the power fail detection register is a register of 8 bits.

4. The power noise prevention device of claim 1, wherein the power fail detection register comprises:

a first signal bit for establishing a normal state or a power fail state for the controller;

a second signal bit for establishing an operation mode of the power fail detection part; and a third signal bit for establishing an enabling state of the power fail detection part.

5. The power noise prevention device of claim 4, wherein at least one of the first, second and third signal bits is selected randomly using software.

6. The power noise prevention device of claim 4, wherein at least one of the first, second and third signal bits is selected by a user.

7. The power noise prevention device of claim 4, wherein the power fail detection part detects only the reset level when a value of the second signal bit is 1, or detects both the freeze and reset levels when the value of the second signal bit is 0.

8. The power noise prevention device of claim 1, wherein the power fail detection part comprises:

a freeze level detection part outputting a freeze signal to the clock freezing and synchronizing part when the power level to the controller is reduced to the freeze level; and a reset level detection part outputting a reset level detection signal to the reset part when the power level to the controller is reduced to the reset level.

9. The power noise prevention device of claim 8, wherein the freeze level detection part comprises:

an OR gate performing an OR operation on a detection mode signal and a detection enabling signal;

a first PMOS transistor having a source connected to a power source terminal and a gate connected to an output terminal of the OR gate;

a first resistor connected to a drain of the first PMOS transistor;

a first diode type MOS transistor connected between the first resistor and a ground;

a first NMOS transistor having a gate connected to the output terminal of the OR gate;

a second NMOS transistor having a gate receiving a power fail state signal and connected to the first NMOS transistor; and a second resistor connected between the second NMOS transistor and the ground.

10. The power noise prevention device of claim 9, wherein the first NMOS transistor is connected in parallel with the first diode type NMOS transistor.

11. The power noise prevention device of claim 9, wherein the second NMOS transistor is connected in parallel with the first diode type NMOS transistor.

12. The power noise prevention device of claim 8, wherein the reset level detection part comprises:

a second PMOS transistor having a source connected to a power source terminal and having a gate receiving an enabling signal;

a third resistor connected to a drain of the second PMOS transistor;

a second diode type MOS transistor connected between the third resistor and a ground;

a third NMOS transistor having a gate receiving the enabling signal;

a fourth NMOS transistor having a gate receiving the power fail state signal and connected to the third NMOS transistor; and a fourth resistor connected between the fourth NMOS transistor and the ground.

13. The power noise prevention device of claim 12, wherein the third NMOS transistor is connected in parallel with the second diode type-NMOS transistor.

14. The power noise prevention device of claim 12, wherein the fourth NMOS transistor is connected in parallel with the second diode type NMOS transistor.

15. The power noise prevention device of claim 1, wherein the controller is a micro-controller unit (MCU).

16. The power noise prevention device of claim 15, wherein the power noise prevention device is included in the MCU.

17. A power noise prevention device for an a microcontroller unit (MCU), comprising:

a power fail detection part detecting a power level to the MCU based on a predetermined freeze level and a predetermined reset level and selectively generating first and second signals based on the detection;

a freezing part selectively freezing an operation of the MCU in response to the first signal; and a reset part selectively resetting the MCU in response to the second signal.

18. The power noise prevention device of claim 17, wherein the power fail detection part detects the power level based on a user input.

19. The power noise prevention device of claim 17, wherein the power fail detection part detects the power level based on input signals randomly generated by a computer program.

20. The power noise prevention device of claim 17, wherein the predetermined freeze level is higher than the predetermined reset level.

21. A power noise prevention method for a controller, the method comprising:

detecting a power level to the controller based on a predetermined freeze level and a predetermined reset level;

selectively generating first and second signals based on the results of said detecting;

freezing an operation of the controller in response to the first signal when the power level to the controller reaches the predetermined freeze level; and resetting the controller in response to the second signal when the power level to the controller reaches the predetermined reset level.

22. The method of claim 21, wherein the detecting step detects the power level to the controller based on a user input.

23. The method of claim 21, wherein the detecting step detects the power level to the controller based on input signals randomly generated by a computer program.

24. The method of claim 21, wherein the predetermined freeze level is higher than the predetermined reset level.

* * * * *